Oct. 26, 1965 H. V. LITTELL 3,213,608
ANTI-POLLUTANT DEVICE AND METHOD
Filed April 5, 1965

INVENTOR
HORACE V. LITTELL
BY C. G. Stratton
ATTORNEY

United States Patent Office 3,213,608
Patented Oct. 26, 1965

3,213,608
ANTI-POLLUTANT DEVICE AND METHOD
Horace V. Littell, 1429 Wedgewood Drive,
Anaheim, Calif.
Filed Apr. 5, 1965, Ser. No. 445,479
8 Claims. (Cl. 60—30)

This application is a continuation-in-part of my pending application, Serial No. 290,998, filed June 27, 1963, bearing the same title.

This invention relates to a method and means for materially reducing harmful atmospheric pollutants from the gases generated by an internal combustion engine and exhausted therefrom.

It has long been known that internal combustion engines do not completely burn all the elements of the fuel in the combustion chambers thereof. When these incompletely burnt gases are exhausted into the atmosphere, they frequently combine with other pollutants generated by industry and also discharged into the atmosphere to cause a seriously contaminated condition of the atmosphere to take place. Much of the polluted condition of the atmosphere in certain areas results from incomplete combustion of boron and lead oxides present in the exhausts of the internal combustion engines of automobiles. This polluted atmosphere has been found to be injurious to health and to plant life.

There have been other devices which, in one manner or another, have attempted to eliminate the harmful elements of the exhausts of internal combustion engines. These have generally been of the catalytic type or the afterburner type in which the gases are either caused to be converted into non-harmful products by the use of a filter and catalytic agent or by providing a chamber in which the exhaust gases are sparked into additional burning before being exhausted into the atmosphere. Neither of these methods nor other methods that have been tried have proved to be satisfactory as commercially feasible pollutant inhibitors.

It is therefore an object of this invention to provide a device and provide a method of converting the products of combustion in the exhausts of internal combustion engines from harmful pollutants into non-harmful products.

Another object of this invention is to provide a method and means of eliminating harmful pollutants from the exhausts of internal combustion engines which can be easily incorporated into generally conventional engines at minimum cost.

A further object of this invention is to provide an improved method of so completing the combustion of an internal combustion engine that the exhaust gases are quite harmless.

A still further object of the invention is to provide a device and a method that introduces a mixture of atmospheric air and the fumes of the engine crankcase into the exhaust and utilizing the same for igniting the exhaust gases at or adjacent to where the same are discharged from the engine.

A yet further object of the invention is to create a back-firing flash of ignited exhaust gases, air and the fumes of the engine crankcase to clean and burn away carbon from the combustion chambers of the engine as well as cleaning the electrodes of the spark plugs therein.

A yet further object of the invention is to utilize regulation by the throttle valve of the engine for controlling the amount of burnt gases entering the exhaust system of the engine to avoid back firing and muffler explosion.

This invention also has for its objects to provide novel, economical and convenient methods or processes of superior utility, and to provide apparatus that is positive in operation, convenient in use, easily installed in working position and easily disconnected therefrom, economical of manufacture, relatively simple, and of general superiority and serviceability.

The invention also contemplates novel combinations of method steps as well as novel details of construction and novel combinations and arrangements of parts, which will appear more fully in the course of the following description, which is based on the accompanying drawing. However, said drawing merely shows and the following description merely describes, the invention with respect to preferred methods and apparatus, the same, nevertheless, being given by way of illustration or example only.

In the drawing, like reference characters designate similar parts in the several views.

Figure 1:
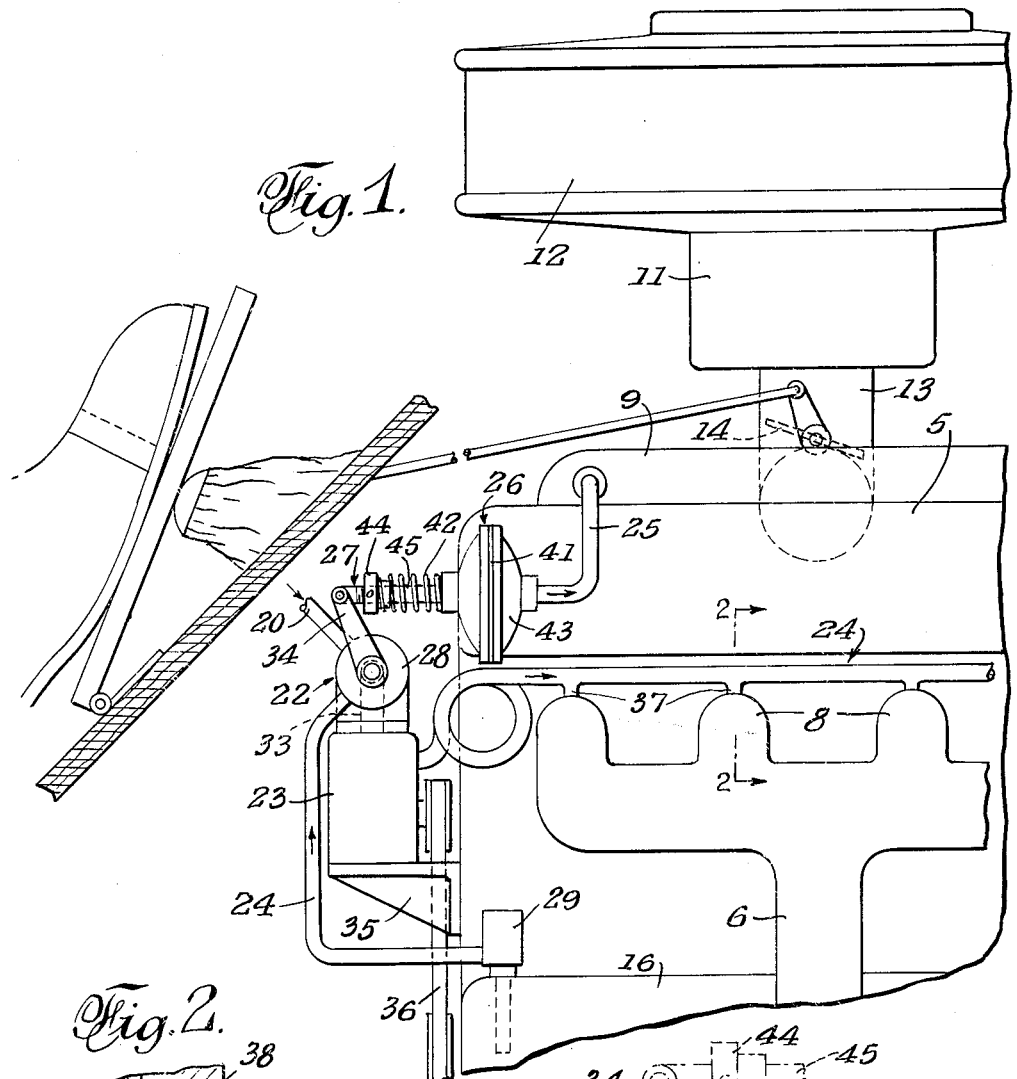
FIG. 1 is a broken side view of a typical internal combustion engine provided with an anti-pollutant device according to the present invention.
Figure 2:
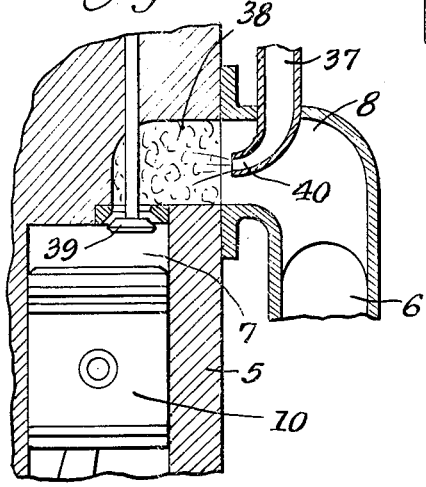
FIG. 2 is an enlarged cross-sectional view as taken on the line 2—2 of FIG. 1.

The drawing shows a conventional internal combustion engine 5 that, typically, is provided with an exhaust manifold 6 that conducts the products of combustion from the cylinders 7 of said engine to atmosphere through the usual tail and exhaust pipe (not shown). It is quite usual for the exhaust manifold to be formed with individual outlet portions 8, one for each cylinder 7 of said engine. Such engines create fuel-feeding suction in the upper portions of the cylinders thereof during the intake stroke or cycle of the engine.

FIG. 1 also shows the intake manifold 9 which, in the usual manner, opens into the engine cylinders 7 and, therefore, is subject to the suction in said cylinders during the intake stroke of the pistons 10 that are operative in said cylinders. This view also shows a downdraft carburetor 11 with its air cleaner 12, and the duct 13 that conducts carbureted air or gases from the carburetor to the manifold 9. The usual throttle valve 14 in the duct 13, from a closed or nearly closed position, is conventionally opened to the degree desired by depression of the pedal 15 by the person controlling operation of the engine.

It has been observed, during operation of the above-described conventional internal combustion engine that the gases, where the same enter the manifold portions 8, are ordinarily sufficiently hot to produce flames. However these flames are at a temperature below that which is required for substantially total combustion of the exhaust gases entering the manifold 6. As a consequence, said gases contain and retain the harmful air pollutants as they move toward exhaust. Most gasoline additives, such as boron and the lead oxides, will burn at about 1300° F. As a consequence, it is necessary to raise the temperature of burning exhaust gases which contain such additives in order to effect ignition of the latter and a more complete combustion of the exhaust gases. The present invention untilizes the flames already present in the gases being discharged into the exhaust manifold in order to effect a more intense burning of said gases by introducing thereinto a mixture of oxygen and the fumes emanating from the crankcase 16, the same being designed to raise the temperature of the burning gases to about 1400° F.—a temperature at which the unconsumed additives in the exhaust will burn, if not totally, at least to a substantial degree. Thus, the exhaust gases reaching atmosphere will be materially cleaner, have less odor and be devoid of most of the pollutants heretofore discharged into the atmosphere. By using the above-mentioned mixture of oxygen and crankcase fumes to ignite and raise the temperature of the exhaust gases, said fumes are kept from being discharged into the atmosphere, as is presently the case, and are thereby kept from the carburetion system of the engine to obviate the possibility of blow-by gases in the crankcase being recirculated to said system.

The present system for supplying a mixture of oxygen and crankcase fumes to the exhaust system of the entire comprises, generally, a source of air or oxygen 20, a conduit 21 for conducting fumes emanating from the crankcase 16, of the engine 5, a valve 22 that, when open, combines such air and fumes, a pump or compressor 23 to place such combined flow under pressure, a manifold 24 to conduct said flow to the exhaust manifold portions 8 at points thereof that are subject to passage of burning exhaust gases, a suction line 25 extending from the intake manifold 9 of the engine, a controller 26 responsive to the degree of suction in said line 25, means 27 operated by the controller and connected to and moving the valve 22 to and from open and closed positions according to the engine suction, as manifested in the line 25, to feed the pump 23, thereby providing the source of the pressure flow in the manifold 24.

The oxygen source 20 may be provided with an air cleaner (not shown), the same being directly connected to the body 28 of the three-way valve 22. The fumes conduit 21 is shown with a filter 29 that is primarily concerned with interception of carbon particles to the valve 22. Said conduit is directly connected to a different part of the valve body 28.

Figure 3:
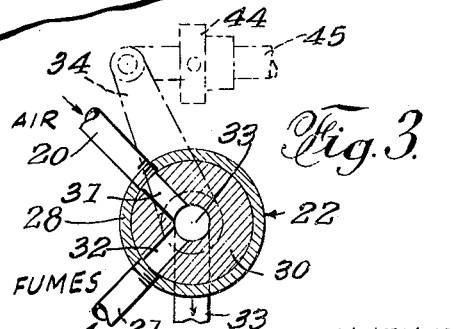
FIG. 3 is an enlarged cross-sectional view of a suction-controlled three-way valve that is shown in FIG. 1 in elevation.

The valve 22 comprises the mentioned body 28, and a plug 30 operating in said body and having radial passages 31 and 32 that are in communication with an outlet passage 33, the latter constituting the inlet for the pump 23. FIG. 3 shows the passages respectively connected to the air inlet 20 and fumes duct 21, thereby providing a flow mixture of air and fumes that enters the passage 33. By rotating the plug 30 by means of an arm 34 to cause displacement of the passages 31 and 32 from said air line 20 and fumes conduit 21, flow is either closed in passage 33 or reduced if there is a partial flow of air and fumes into the valve plug passages.

The pump 23 is shown as mounted by a bracket 35 on the engine block and may be driven, as by a belt drive 36, by the engine. Whether so driven or in any other way, the pump 23, when valve 22 is open, discharges a flow of compressed air and crankcase fumes into the manifold 24. Said manifold is provided with extensions 37 that are directed to discharge said air-fumes mixture into the outlets 38 into which the cylinders 7 exhaust past the open exhaust valves 39. Said extensions 37, at their ends within the exhaust manifold portions 8, are formed as nozzles or jets 40 so as to direct the air-fumes mixture into said passages 38 before the flames therein reach the portions 8.

The constant supply of this oxygen-included mixture to the exhaust manifold 6 provides oxygen to intensify the heat of the exhaust gases as the same leave the engine cylinders 7. Thus, most of the slower-burning constituents of the exhaust gases are consumed immediately that they enter the exhaust manifold; thereby, without requiring a separate supply of after-burner heat, the partially burned exhaust gases are more completely burnt to greatly reduce pollutants therein.

It will be clear that the usual temperature of the gases of combustion of an engine is below the level where the same will burn certain gasoline additives, as above mentioned. The present air-fumes mixture, supplied to the exhaust outlets 28, raises this temperature to the level where the same will at least partially burn said additives. Further, the heat of the combustion gases is here employed for consuming crankcase emanations. Hence, the invention has the two-fold advantage of consuming pollutants contained in engine exhaust and pollutants contained in crankcase emanations.

As above briefly explained, the flow of the air-fumes mixture for compression by the pump 23 is had only when valve 22 is open, wholly or partially. This occurs when there is no or little suction in the line 25. In this case, there will be no pull on the diaphragm 41 of the controller 26, except by a spring 42 that has abutment, at one end, with the body 43 of the controller and, at the opposite end, with an adjustable abutment 44 on the stem 45 that is affixed to the diaphragm 41. As shown in FIG. 3, the valve 22 is open under these conditions. Therefore, the pump 23 will be forcing an air-fumes mixture into the chambers or outlets 38. Assuming a normal suction to be not more than twenty (20) inches at sea level, a throttled-down engine will have a normal vacuum in its intake manifold. An engine that is under compression, as when in a vehicle rolling down hill, will have the valve 22 closed. At other times, when the engine is not under compression, the valve 22 is open.

When the engine is under compression, there is sufficient vacuum to cause a pull on diaphragm 41 against the bias of the spring 42. The valve arm 34 will thereby be moved, causing the valve plug to turn and its passages to move out of register with the air and fumes lines 21 and 22. This movement will shut off the air-fumes flow to the chambers 38.

The abutment 44 may be adjusted along the stem 45 to obtain air-fumes flow according to a desired vacuum. The controller 26 may comprise a piston type device in which a piston in a cylinder is moved by the spring 42 in one direction and vacuum in the opposite direction.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. The method of reducing the amount of air pollutants in the exhaust of an internal combustion engine using fuel containing slow-burning additives, said method consisting in
   (a) introducing oxygen combined with fumes emanating from the crankcase of said engine into the exhaust gases from the cylinders of said engine at a point where said gases enter the exhaust manifold, whereby said oxygen-fumes mixture increases the temperature of said gases to a degree that will ignite slow-burning additives in said gases, and
   (b) controlling such introduction of the oxygen-fumes mixture by variations in the vacuum in the intake manifold, a higher range of vacuum shutting off said flow and the lower range inducing said flow.

2. The method of reducing the amount of air pollutants in the exhaust of an internal combustion engine using fuel containing slow-burning additives, said method consisting in
   (a) placing a mixture of oxygen and fumes from the crankcase of said engine under pressure,
   (b) introducing a flow of said mixture into the exhaust gases from the cylinders of said engine at a point where said exhaust gases enter the exhaust manifold of the engine, whereby said oxygen-fumes mixture increases the temperature of said gases to a degree that will ignite slow-burning additives in said gases, and
   (c) controlling such introduction of the oxygen-fumes mixture by variations in the vacuum in the intake manifold, a higher range of vacuum shutting off said flow and the lower range inducing said flow.

3. A method according to claim 2 in which the degree of temperature of the gases is raised to a level above the ignition level of the slow-burning additives in said gases.

4. A method according to claim 3 in which the fumes, at least partially, are consumed simultaneously by said increase of temperature level.

5. In combination,
(a) an internal combustion engine having an intake manifold in which vacuum varies according to the throttled and load conditions on said engine, having an exhaust manifold, and a crankcase,
(b) a line from a source of air,
(c) a line to conduct fumes emanating from the crankcase,
(d) a three-way valve to which said lines are connected and having an outlet for the air-fumes mixture supplied by said lines,
(e) means to compress said mixture received from said outlet and to conduct the same to the exhaust manifold at a point thereof where the flaming gases of combustion of the engine enter said manifold, to provide the flaming gases with combustion-increasing oxygen, and
(f) means controlled by variation of vacuum in the intake manifold of the engine to open said valve during normal suction and move said valve to close under increased suction.

6. The combination of claim 5, the mixture conducting means comprising
(a) an engine-driven pump included in said mixture-compressing means.

7. The combination of claim 5, the last mentioned means comprising
(a) a controller connected to and subject to the vacuum of the intake manifold,
(b) a member movable in one direction by said suction, and
(c) a spring bias to move said member in the opposite direction,
(d) said member being connected to operate said valve.

8. The combination according to claim 7, provided with means to regulate the bias of the spring to, thereby, vary the operative effect of the vacuum on the controller.

References Cited by the Examiner

UNITED STATES PATENTS

| | | | |
|---|---|---|---|
| 187,170 | 2/77 | Parson | 230—95 X |
| 2,203,554 | 6/40 | Uhri. | |
| 2,263,318 | 11/41 | Tifft | 60—30 |
| 3,086,353 | 4/63 | Ridgway | 60—30 |

MARK NEWMAN, *Primary Examiner.*